Figure 1:
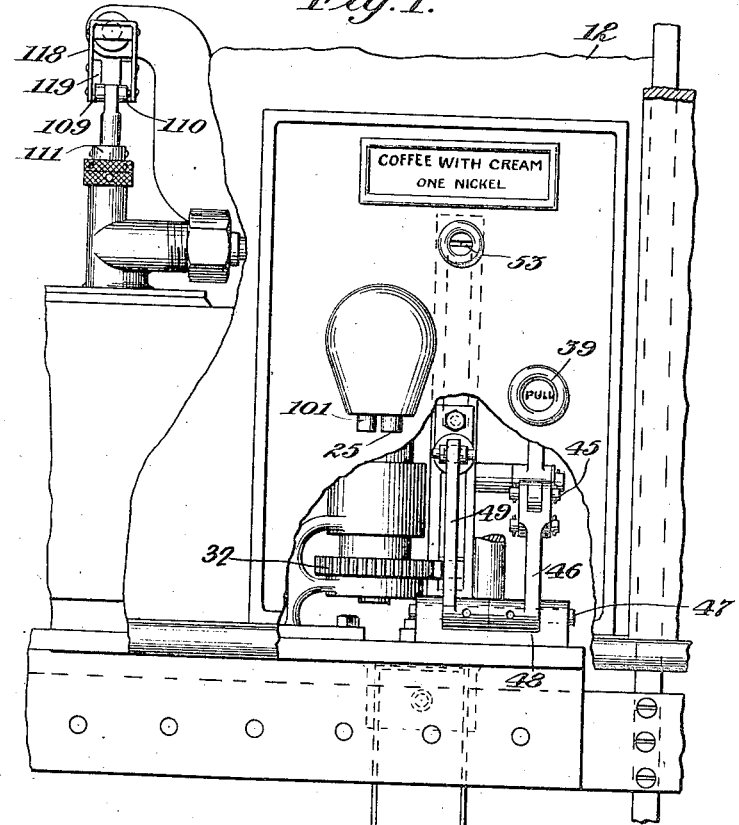

Aug. 14, 1923.

J. FRICK 1,465,122

LIQUID DISPENSING MACHINE

Filed May 1, 1922   5 Sheets-Sheet 1

Inventor:
John Frick,

Cushman, Bryant & Darby
Att'ys.

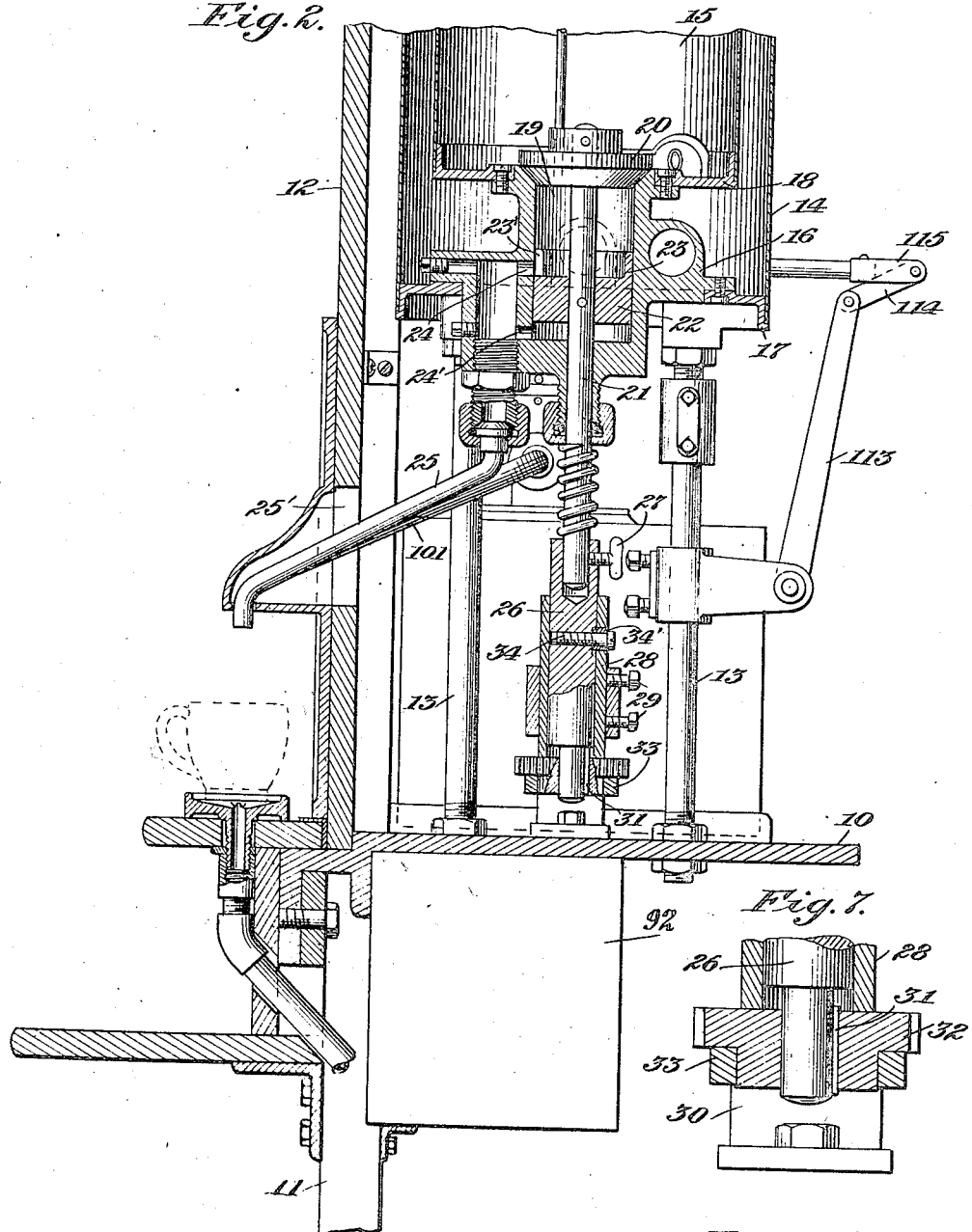

Aug. 14, 1923.

J. FRICK

LIQUID DISPENSING MACHINE

Filed May 1, 1922

1,465,122

5 Sheets-Sheet 3

Inventor:
John Frick,
By Cushman, Bryant & Darby
Att'ys.

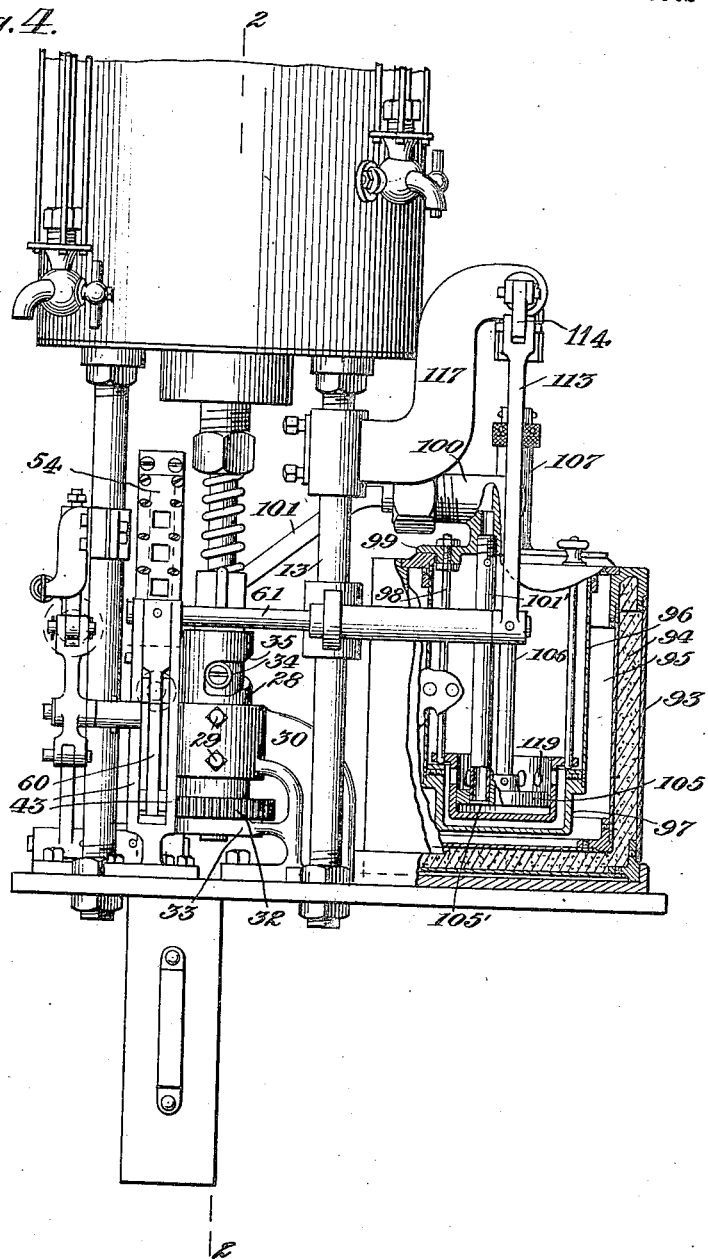

Aug. 14, 1923.
J. FRICK
1,465,122
LIQUID DISPENSING MACHINE
Filed May 1, 1922    5 Sheets-Sheet 5
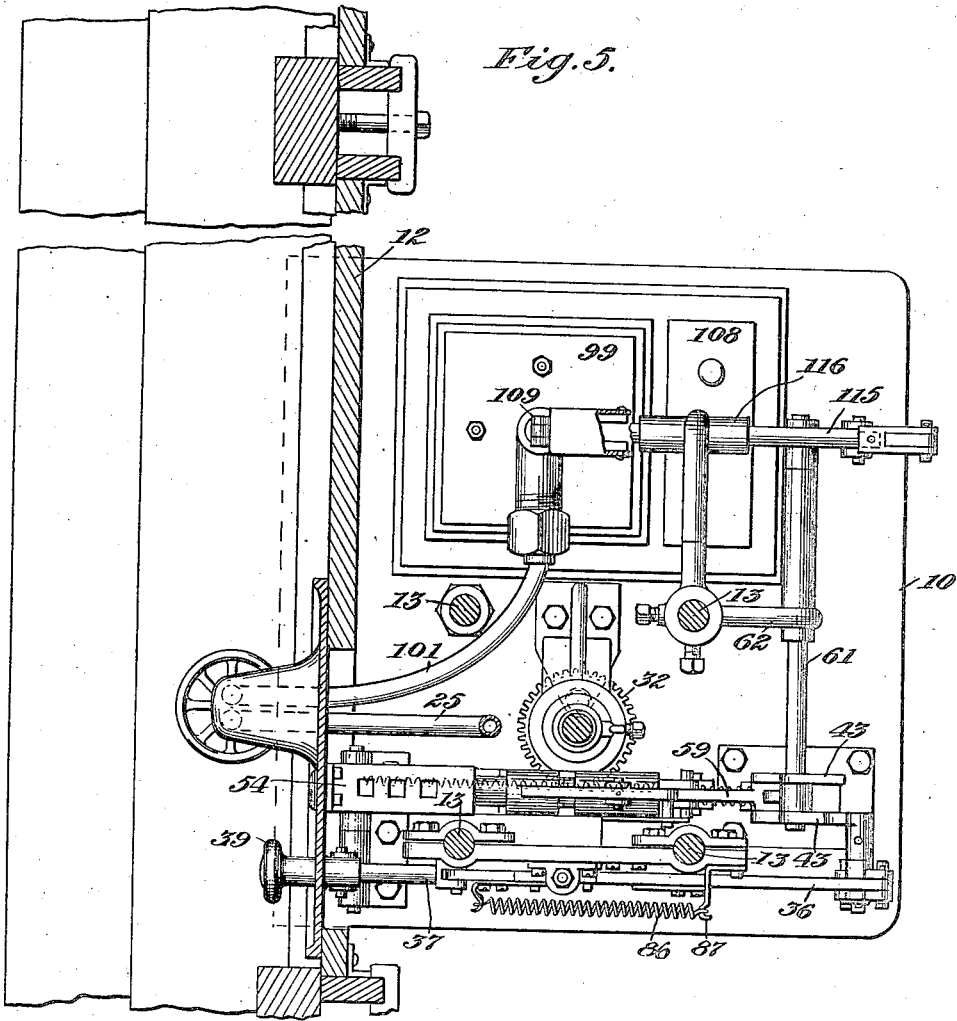
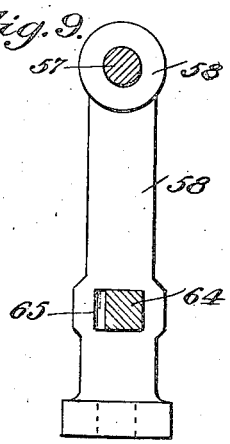
Inventor:
John Frick, Patented Aug. 14, 1923.

1,465,122

UNITED STATES PATENT OFFICE.

JOHN FRICK, OF PHILADELPHIA, PENNSYLVANIA.

LIQUID-DISPENSING MACHINE.

Application filed May 1, 1922. Serial No. 557,698.

*To all whom it may concern:*

Be it known that I, JOHN FRICK, a citizen of the United States, residing at Philadelphia, in the county of Philadelphia and State of Pennsylvania, have invented new and useful Improvements in Liquid-Dispensing Machines, of which the following is a specification.

This invention relates to a machine for dispensing liquids, and more particularly to a machine of this character adapted to dispense a plurality of liquids substantially simultaneously, or in close succession.

Apparatus of this general type are broadly old, and it is the object of the present invention to improve upon machines heretofore known by providing simplified operating mechanism which may be readily operated manually, and which will permit access to be had to the working parts for cleansing purposes without interference with the operating mechanism.

A prime object of the invention is a simple construction positive in the operation of its various parts so that the mechanism is not liable to become out of order.

An additional object of the invention is to associate with the operating mechanism a simple and efficient check controlled mechanism provided with locking devices which will prevent the delivery of more than a predetermined amount of liquid with each check or token.

Other objects of the invention reside in the more detailed features of construction set forth in the following description; these objects of the invention will become clear as the description proceeds in connection with the accompanying drawings, wherein there is shown one form of a device in which the invention may be embodied. In the drawings:—

Figure 6:
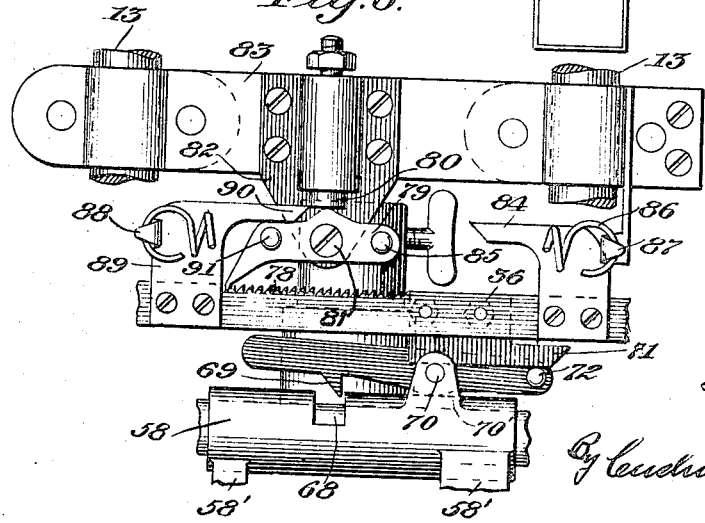
Figure 3:
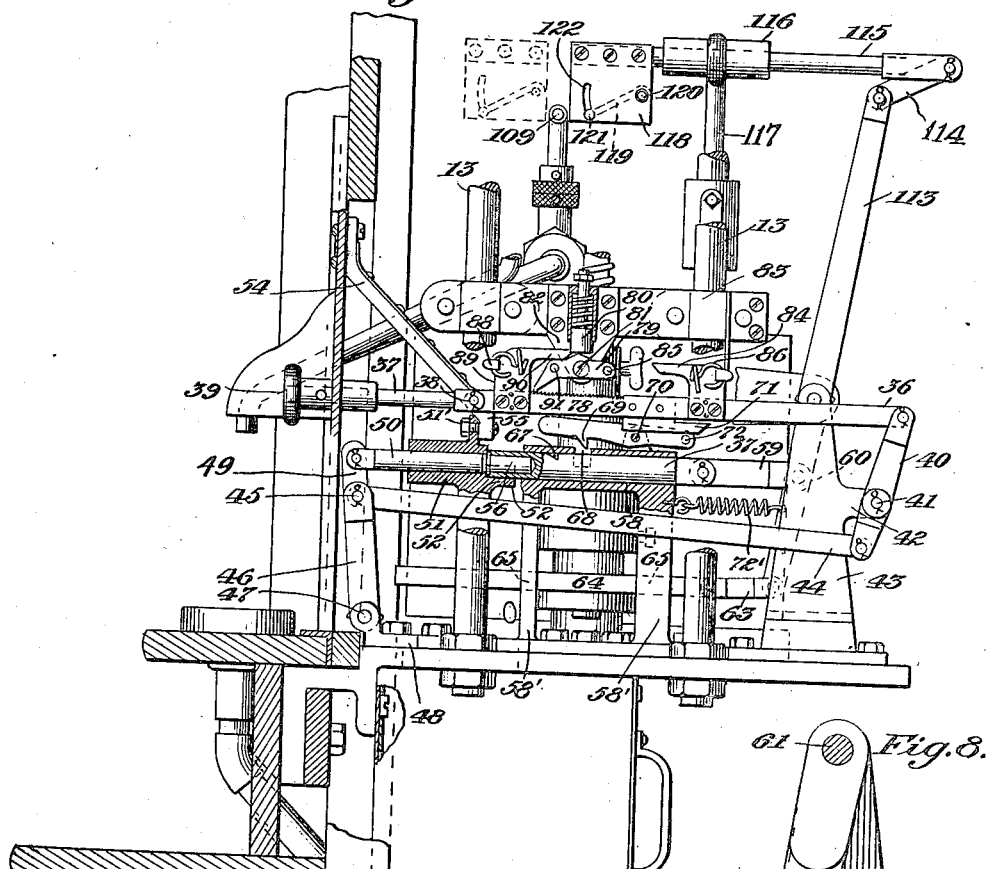
Figure 8:
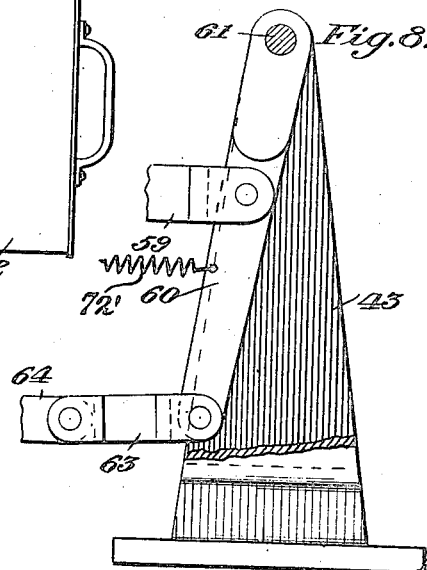

Fig. 1 is a partial front elevational view with a portion of the casing broken away to illustrate certain features of the operating mechanism, Fig. 2 is a vertical cross section on the line 2—2 of Fig. 4, Fig. 3 is a side elevation, Fig. 4 is a rear elevational view with certain parts broken away, Fig. 5 is a horizontal cross section taken on a line below the main liquid container, Fig. 6 is an enlarged detail of the operating mechanism, Fig. 7 is an enlarged view of the lower end of the valve stem showing the operating pinion in cross section, Fig. 8 is a detail of the supporting bracket for a portion of the operating mechanism, and Fig. 9 is an end elevational section showing the support for the valve operating rack.

Referring to the drawings for a more detailed description, and more particularly to Figs. 2 and 5, 10 indicates a platform or base mounted upon suitable uprights 11 and having a front wall 12 serving to conceal the operating mechanism and liquid containers. A plurality of vertical rods or standards 13, in the present instance four in number, rest upon the base, and at their upper ends serve to sustain an urn 14 having therein a smaller container 15 adapted to receive coffee or other liquid to be served. In the space between the wall of the urn 14 and the wall of the container 15 may be positioned suitable means, such as a steam coil (not shown) for maintaining the liquid in the container 15 hot. A casting 16 extends through the bottom 17 of the urn and is secured to the bottom 18 of the coffee container. This casting is formed with a measuring cup 19 opening into the container 15 at its upper end and normally shut off therefrom by means of a valve 20 having a stem 21 extending through the center of the cup and downwardly through the bottom of the casting. Within the measuring cup and keyed upon the valve stem for rotation therewith is a rotary valve 22 having a flange 23, which serves to close an outlet port 24 in the measuring cup. The flange 23 is provided with a port 23' adapted to register with the port 24 in order to permit the liquid to flow therethrough, the liquid passing through a suitable outlet tube 25 which extends through an opening 25' in the front wall of the casting or frame. Beneath the valve 22 the measuring cup is provided with a second outlet 24' so that any liquid which leaks past the valve may make its exit through the drain opening 24.

The valve stem 21 is secured to a stem extension 26 as by means of a set screw 27, and the extension is mounted for rotary movement in a sleeve 28 (Figs. 2 and 4) which is fixedly secured by means of set screws 29 in a bracket 30 positioned upon the base or platform 10. The lower end of the valve stem extension has formed thereon a key 31 (Figs. 2 and 7) which serves to connect the valve stem and its extension for rotary motion with a pinion 32 journaled in a collar 33 on the bracket 30. Rotation of the pinion results in rotation of the stem through its extension, and also rotation of the valve 22, which closes the port 24 preliminary to the raising of the valve 20 to permit liquid to flow into the measuring cup. The valve stem extension 26 has secured therein a pin 34, (Figs. 2 and 4) the outer end of which extends through a circumferentially extending and upwardly inclined slot 35 in the sleeve 28, and a roller 34' upon the pin is adapted to engage the edge of the opening as the valve stem extension is rotated through the pinion upon its lower end. It will be observed from an inspection of Fig. 4 that the initial portion of the slot 35 is in a substantially horizontal plane, and during the passage of the pin 34 through this portion of the slot the valve stem is simply rotated, but as the rotation of the valve stem extension continues the roller 34', engaging the upwardly inclined portion of the slot, causes the valve stem extension, the valve stem and the valve 20 to be moved upwardly, thus permitting the liquid to flow into the measuring cup; but it will be understood that previous to the lifting of the valve 20 the flange 23 of the valve 22 has closed the exit port 24.

The mechanism for operating the valve mechanism above described is preferably coin or check controlled so that liquid will not be dispensed until the operator has inserted in the machine a suitable check or token of predetermined value. This mechanism, which will now be described, comprises a manually operable reciprocable bar 36 (Fig. 3) having an extension 37 pivotally connected thereto at 38 and projecting through the front wall of the casing, where it is provided with a suitable knob 39 adapted to be engaged by the hand of the operator. The rear end of the bar is pivotally connected to a lever 40 fulcrumed upon a stud 41 secured in an arm 42 extending from a bracket 43 positioned upon the platform 10. The lower end of the lever 40 is pivotally secured to a connecting rod 44 which extends forwardly and is secured by means of a pin 45, Figs. 1 and 3, to the forked upper end of a rocket arm 46 fixedly mounted upon a rock shaft 47. The rock shaft 47 has bearings in a bracket 48 and has fixedly secured thereon beside the rocker arm 46 a second upwardly extending rocker arm 49 (Fig. 1) pivotally connected at its upper end to a push rod 50 which has a bearing in a sleeve 51. The sleeve 51 has a rearwardly projecting lip 52 which serves to receive a coin and maintain the latter upon its edge in rear of the push rod 50, and is secured at 51' to the lower end of a coin chute 54 into which the coin may be deposited through the slot 53 (Fig. 1) in the front wall 12. The open lower end 55 of the chute is located directly above the lip 52 and directs the coin to the latter. The push rod 50 cooperates with a plunger 57 having a forward hollow end 56 which receives the end of the push rod 50 unless a coin is interposed between the push rod and plunger, this type of coin controlled mechanism being well known needs no further description. The plunger 57 is slidably mounted in the sleeve 58 of bracket having legs 58' (Figs. 3 and 9) and is pivotally secured at its rear end to a link 59, which, in turn, is pivotally connected to the intermediate portion of a downwardly extending rocker arm 60 (Figs. 3, 4 and 8). The rocker arm 60 is fixedly secured to and supported upon a rock shaft 61 which has bearings in the upper end of bracket 43 and in a bracket arm 62 (Fig. 5) supported upon one of the uprights 13. The lower end of the rocker arm 60 is pivotally connected by means of a link 63 to a rack 64 slidably mounted in bearings 65 in the vertical leg portions 58' of the bracket carrying plunger sleeve 58. The rack 64 is in engagement with the pinion 32 upon the valve stem extension, and obviously, reciprocation of the rack will result in opposite rotary movements of the pinion.

It will be understood, of course, that unless a suitable token is positioned between the push rod 50 and the plunger 57, movement of the plunger by means of the mechanism above described will result merely in the forward end of the push rod being projected into the hollow end of the plunger without movement of the plunger or the pinion operating rack to which it is connected. Upon insertion of a coin, however, between the push rod and plunger, and the withdrawal of the manually operable rod 36, the push rod carries the coin and plunger rearwardly or to the right, as shown in Fig. 3, until the plunger is fully retracted and a shoulder 67 (Fig. 3) in the plunger registers with an opening 68 (Figs. 3 and 6) in the plunger sleeve beneath a latch 69. The latch 69 is pivotally mounted at 70 between upwardly extending ears 70' upon the sleeve 58, and is gravity operated to engage the shoulder 67, but is normally restrained from such engagement by means of an arm 71 extending downwardly from the manually operable bar 36. The arm 71 engages a pin 72 extending laterally from the latch and holds the latch in the raised position shown in Fig. 6, but when the operator withdraws the bar 36 and thereby disengages the arm 71 from the pin 72 the latch is permitted to move under the influence of gravity to engage the shoulder 67, and is not disengaged from the plunger 57 until the bar 36 is returned by the operator. When the bar 36 is permitted to return by the operator to release the plunger 57, the latter is operated by a spring 72' (Fig. 3) secured at one end to the bracket 58 and at its other end to the rocker arm 60. This return movement of the plunger and of the rack 64 results in reverse rotation of the pinion and valve stem; during the initial portion of this reverse rotation the pin 34 upon the valve stem extension is traveling over the inclined portion of the slot in the supporting sleeve 28, and as a result the valve 20 is lowered together with the valve stem while, at the same time, the rotary valve 22 is being rotated. This operation of closing the valve 20 prevents the inlet of additional liquid into the measuring cup preliminary to the opening of the port 24, and during the final portion of the movement of the valve 22 the port 23' of the valve is brought into registry with the port 24 of the measuring cup to permit the liquid in the cup to drain therefrom.

In order to insure movement of the plunger 57 until the catch 69 engages and locks the plunger, the bar 36 is preferably locked against reverse movement until it has been completely withdrawn by the operator. It will be observed from an inspection of Figs. 3 and 6, that the upper edge of this bar is ratcheted as at 78, and a pawl 79 is normally held in engagement with the ratchet by means of a spring pressed plunger 80 positioned above the fulcrum 81 of the pawl. The pawl is mounted upon a depending portion 82 of a bar 83 extending between and supported upon standards 13. The plunger 80 maintains the pawl in engagement with the ratchet, thus preventing reverse movement of the bar 36 until an upwardly and forwardly extending arm 84 upon the bar 36 engages a pin 85 upon the rear end of the pawl and raises the pawl. The bar 36 is then free to return until the influence of a spring 86 secured at one end to a hook 87 depending from the bar 83, and at its other end to a hook 88 upon the rear end of an upwardly extending arm 89 having a horizontally extending portion 90 adapted to engage a pin 91 upon the forward end of the pawl when the bar 36 has fully returned, and thereby again to bring the pawl into engagement with the ratchet. It should be understood that the plunger 57 is not released by its catch 69 until the bar 36 has completed the major portion of its return movement, and as a result, the push rod 50, which returns to its normal position with the bar 36, completes at least a portion of its return movement while the plunger 57 is stationary. The coin which, up to the time the push rod 50 starts its return movement, has been held between the end of the push rod and the end of the plunger, is thus released when the push rod starts its reverse movement and drops into a coin box 92 beneath the platform or base 10.

In dispensing coffee, tea and similar liquids it is desirable to dispense, at the same time, an additional liquid, such as cream, which is to be mixed with the coffee or tea. For this purpose there is associated with the above described operating mechanism a container which may be employed for the retention of a liquid, such as cream, and means for discharging the liquid from the container, which means is connected with the operating mechanism so as to be actuated thereby. By reference to Fig. 4 it will be observed that there is positioned upon the base 10 a container 93 having therein suitable insulating means 94 surrounding a chamber 95 in which may be located a cooling means, such as ice or a cold liquid. The chamber 95 surrounds a cream container 96 in the lower end of which is positioned a cylinder 97 supported by suspension rods 98 extending downwardly from the top 99 of the container. To the top of the container is connected, by means of a coupling 100, a discharge tube 101 which extends forwardly and has its outlet adjacent the outlet of the coffee discharge tube 24. A piston 105 works within the cylinder 97 and its stem 106 projects upwardly through the cover of the container, a bearing 107 for the piston rod being provided in the cover, which is rigidly secured to the top of the container. The container is also provided with a removable cover 108 permitting the ready deposit of cream into the receptacle without disturbing the fixed cover 99.

The upper end of the piston rod has thereon a cross arm 109 (Figs. 1 and 5) upon which, at opposite sides of the piston rod, are positioned rollers 110, and a stop collar 111 upon the piston rod is adapted to engage the upper end of the bearing for the purpose of varying the length of the piston stroke, the collar being adjustable along the piston rod for this purpose. The piston has therein (Fig. 4) an opening 105' through which projects an extension 101' of the discharge pipe so that upon reciprocation of the piston within the cylinder the cream admitted to the cylinder through openings 119 upon the upward movement of the piston is subsequently, upon the downward stroke of the piston, forced upwardly through the discharge pipe. The actuating mechanism is connected with the piston rod to reciprocate the piston by means of a rocker arm 113 (Figs. 2 and 4) fixedly secured upon the outer end of rock shaft 61 and extending upwardly from the rock shaft. The rocker arm is connected by means of a link 114 to the outer end of a reciprocable shaft 115 which extends through a bearing 116 in the upper end of a bracket 117 (Fig. 4) mounted upon one of the rods 13. The end of the reciprocable shaft 115 carries a yoke 118 having depending parallel side plates on the inner faces of which are carried tracks 119, each track being pivotally mounted at 120 upon one of the side walls and carrying, at its forward end, studs 121 projecting through an arcuate slot 122 in a side wall. The normal position of the tracks is shown clearly in Fig. 3, and upon movement of the shaft 115 the tracks are carried beneath the cross arm 109 upon the end of the piston rod, the rollers upon the rod riding upwardly over the track as the rod is carried forwardly. The piston is thereby moved upwardly until the tracks are carried to the dotted line position shown in Fig. 3, whereupon the piston within the pump cylinder is free to move downwardly under the influence of gravity and to force the cream which has been admitted into the cylinder by openings 112 through the discharge pipe extensions 101'. Upon the return movement of the shaft 115 and the yoke the tracks 119 engaging the cross arm 109 are lifted upwardly about their pivots 120. It will be observed that the cream is forced out of the cylinder 97 during the return movement of the shaft 115 and while the rack 64 is closing the valve 20 in the coffee urn preliminary to opening the drain port 24 in the measuring cup. Thus the cream is delivered before the outlet port 24 of the measuring cup is opened and the coffee or other fluid is permitted to flow from the measuring cup.

In using the apparatus, the operator, prior to pulling the bar 36 by means of handle 39, inserts a check in slot 53 which is directed by the coin chute to a position in front of the push rod 50. Upon withdrawal of the operating bar 36 the push rod 50 engages the coin and by means of the coin carries the plunger 57 rearwardly in its supporting sleeve. The operating bar must be completely withdrawn since prior reverse motion is prevented by means of latch or pawl 79, and upon complete withdrawal of the operating bar the plunger 57 is locked in position by means of latch 69. By this time the measuring cup drain port 24 has been closed by rotary valve 22 and the inlet valve 20 has been raised to admit fluid into the measuring cup. When the operator releases the handle 39 spring 86 returns the operating bar and push rod 50 to the position shown in Fig. 3, the pawl 79 having been raised upon complete withdrawal of the operating bar to release the same by means of arm 84 which engages pin 85 upon the pawl. During return movement of the operating bar and push rod 50 the plunger 57 is locked in position by means of latch 69, and thus the valves and operating racks 64 are stationary. As the push rod 50 returns the coin is released and drops into coin box 92 through an opening (not shown) in the platform. During the operation of the plunger and push rod by means of the operating bar the shaft 115, as by means of the inclined tracks 119, raises the cream pump piston, and while the push rod and operating bar are returning to normal position the pump piston descends under the influence of gravity and forces the cream through discharge pipe 101 into a cup which may be positioned, as shown in Fig. 2, beneath the open end of the discharge pipe.

When the operating bar reaches its normal position, as shown in Fig. 3, the arm 71 thereon engaging pin 70 upon the latch 69 raises the latter and permits spring 72' to return the plunger to its position shown in Fig. 3; at the same time the rack 64 is operated to impart to the pinion 32 a reverse rotation which initially draws downwardly and closes the valve 20 to shut off the measuring cup from the coffee container, and then brings port 23 of the rotary valve 22 into registry with the drain port 24, thus permitting the coffee to drain from the measuring cup.

It should be observed that the latch 69 is not recessed until the operating bar has completed at least sufficient portion of its return motion to insure the coin being dropped into the coin box 92, and thus draining of the measuring cup is prevented until the coin is deposited in the coin box. Moreover, it will be observed that the pawl 79 insures complete outward movement of the operating bar before it can be returned, whereby thus repeated and quick movement of the valves with only one coin in order to obtain more than the predetermined amount of coffee or other fluid is prevented, since the rack 64 cannot operate the valve in the measuring cup until the operating bar has returned to its normal position shown in Fig. 3.

Emphasis is laid upon the extreme simplicity of the structure disclosed, and upon the fact that the operation is a manual one, eliminating the necessity for power appliance for operating the mechanism. When the measuring cup or valves are to be cleaned it is simply necessary to release the valve stem 21 in its socket in the upper end of the valve stem extension 26, which is accomplished by removing set screw 27, and the valve 20 and valve 22 may then be removed in order to permit cleaning of the measuring cup and of the valves.

It should be understood that numerous modifications may be made in the structure shown and described without departing from the scope of the invention, the limits of which are defined by the prior art and the following claims.

I claim:

1. A vending machine comprising a plurality of liquid containers, a piston for pumping liquid from one of said containers, a valve for controlling the discharge of liquid from the other container, and manually operable means common to both containers for operating said valve and piston, said means comprising a rock shaft, arms fixedly secured to said shaft, a rack pivotally connected to one of said arms, a pinion connected to said valve and in engagement with said rack, means connected to the other of said arms for actuating said pump piston, and check controlled means for rocking said shaft.

2. In a device of the class described, a liquid container, a reciprocable piston for forcing liquid from said container, a rod secured to said piston having a portion on the outside of said container, a cross arm on said portion of the rod, and means for moving said piston and rod comprising a shaft reciprocable in a direction substantially at right angles to the line of movement of said piston rod, an inclined track on said reciprocable rod positioned to pass beneath said cross arm and to move the piston during the movement of the reciprocable shaft in one direction.

3. In a device of the class described, a liquid container, a reciprocable piston for forcing liquid from said container, a rod secured to said piston having a portion on the outside of said container, a cross arm on said portion of the rod, and means for moving said piston and rod comprising a shaft reciprocable in a direction substantially at right angles to the line of movement of said piston rod, an inclined track on said reciprocable shaft positioned to pass beneath said cross arm and to move the piston during the movement of the reciprocable shaft in one direction.

4. A vending machine as specified in claim 2, said means for actuating the pump piston comprising a shaft reciprocable at substantially right angles to the line of movement of said piston, an inclined track upon said rod, and a cross arm upon the piston rod, said track passing beneath said arm and raising the piston during movement of the reciprocable shaft in one direction.

5. A vending machine as specified in claim 1, said means for actuating the pump piston comprising a shaft reciprocable at substanitally right angles to the line of movement of said piston, an inclined track upon said rod, and a cross arm upon the piston rod, said track passing beneath said arm and raising the piston during movement of the reciprocable shaft in one direction.

6. A vending machine comprising a plurality of liquid containers, means for pumping liquid from one of said containers, a valve for controlling the gravity discharge of liquid from the other of said containers, and actuating devices common to said valve means and said pumping means, said actuating devices comprising a rock shaft operatively connected to both of said means, a plunger connected to said rock shaft to actuate the shaft, and a manually operable reciprocable bar, a connection between said bar and plunger permitting movement of said bar in one direction to move the plunger in the opposite direction, said connection permitting at least partial reverse movement of the manually operable bar independently of the plunger.

7. A vending machine comprising a plurality of liquid containers, means for pumping liquid from one of said containers, a valve for controlling the gravity discharge of liquid from the other of said containers, and actuating devices common to said valve means and said pumping means, said actuating devices comprising a rock shaft operatively connected to both of said means, a plunger pivotally connected to said rock shaft to actuate the shaft, a manually operable reciprocable bar, a connection between said bar and plunger permitting movement of said second bar in one direction to cause the plunger to move in the opposite direction, said connection permitting at least partial reverse movement of the bar independently of the plunger, means for locking said manually operable bar against reverse movement until it has completed its initial movement, and means for locking the plunger against its reverse movement until the manually operable bar has at least started its reverse movement.

8. A vending machine comprising a plurality of liquid containers, means for pumping liquid from one of said containers, a valve for controlling the gravity discharge of liquid from the other of said containers, and actuating devices common to said valve means and said pumping means, said actuating devices comprising a rock shaft operatively connected to both of said means, a plunger connected to said rock shaft to actuate the shaft, a manually operable reciprocable bar, a connection between said bar and plunger permitting movement of said second bar in one direction to cause the plunger to move in the opposite direction, said connection permitting at least partial reverse movement of the bar independently of the plunger, means for locking said bar against reverse movement until it has completed its initial movement, and means for locking the plunger against its reverse movement until the bar has at least started its reverse movement, and means upon the bar for releasing said plunger locking means.

9. A vending machine comprising a plurality of liquid containers, means in association with each container for discharging liquid therefrom, and actuating devices common to both containers comprising a rock shaft operatively connected with each container discharging means, a reciprocable manually operable actuating bar for said rock shaft, locking means for preventing reverse movement of said bar until it has completed its full initial stroke in one direction, means for rendering inoperative said locking means when the bar completes its initial movement in said direction, and means for again rendering operative said locking means when the bar completes its reverse movement.

10. A vending machine comprising a plurality of liquid containers, means in association with each container for discharging liquid therefrom, and actuating devices common to both containers comprising a rock shaft operatively connected with each container discharging means, a reciprocable manually operable actuating bar for said rock shaft, locking means for preventing reverse movement of said bar until it has completed its full initial stroke in one direction, means on said bar for rendering inoperative said locking means when the bar completes its initial movement in said direction, and means on said bar for again rendering operative said locking means when the bar completes its reverse movement.

11. A vending machine as specified in claim 10, having a reciprocable plunger forming a connection between said bar and said rock shaft, said plunger being movable simultaneously with said bar but in an opposite direction, and means for temporarily locking said plunger at the completion of its initial movement in one direction, said locking means being releasable only when the bar has substantially completed its reverse movement, the connecting means between said bar and plunger permitting reverse movement of the bar independently of said plunger.

In testimony whereof I have hereunto set my hand.

JOHN FRICK.